United States Patent
Ates et al.

(10) Patent No.: US 12,497,884 B2
(45) Date of Patent: Dec. 16, 2025

(54) SYSTEMS AND METHODS FOR HYDROGEN PRODUCTION FROM AN UNDERGROUND FORMATION

(71) Applicant: Saudi Arabian Oil Company, Dhahran (SA)

(72) Inventors: Harun Ates, Houston, TX (US); Ravimadhav N. Vaidya, Houston, TX (US)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 18/680,450

(22) Filed: May 31, 2024

(65) Prior Publication Data

US 2025/0369333 A1  Dec. 4, 2025

(51) Int. Cl.
| | |
|---|---|
| *E21B 43/243* | (2006.01) |
| *C01B 3/38* | (2006.01) |
| *C09K 8/70* | (2006.01) |
| *C09K 8/80* | (2006.01) |
| *E21B 43/24* | (2006.01) |
| *E21B 43/38* | (2006.01) |
| *E21B 43/267* | (2006.01) |

(52) U.S. Cl.
CPC .............. *E21B 43/385* (2013.01); *C01B 3/38* (2013.01); *C09K 8/70* (2013.01); *C09K 8/80* (2013.01); *E21B 43/2401* (2013.01); *E21B 43/243* (2013.01); *E21B 43/267* (2013.01)

(58) Field of Classification Search
None
See application file for complete search history.

(56) References Cited

U.S. PATENT DOCUMENTS

| | | | |
|---|---|---|---|
| 4,250,230 A | 2/1981 | Terry | |
| 7,449,167 B2 | 11/2008 | Garg et al. | |
| 7,980,312 B1* | 7/2011 | Hill | E21B 43/241 166/272.2 |
| 9,085,972 B1 | 7/2015 | Hill et al. | |
| 9,127,544 B2 | 9/2015 | Dombrowski et al. | |
| 9,156,690 B2 | 10/2015 | Doshi et al. | |
| 9,388,678 B2 | 7/2016 | Affholter et al. | |
| 2003/0062154 A1* | 4/2003 | Vinegar | E21B 43/243 166/60 |
| 2015/0007988 A1* | 1/2015 | Ayasse | E21B 33/12 166/271 |

FOREIGN PATENT DOCUMENTS

EP  3018095  5/2016

OTHER PUBLICATIONS

Abbas et al., "Hydrogen production by methane decomposition: A review," International Journal of Hydrogen Energy, 2010, 35:1160-1190, 31 pages.

(Continued)

*Primary Examiner* — Andrew Sue-Ako
(74) *Attorney, Agent, or Firm* — Fish & Richardson P.C.

(57) ABSTRACT

The disclosure relates to systems and methods for hydrogen production from an underground formation by providing heat to a first set of fractures to convert a hydrocarbon (e.g., methane, ethane, propane) present in the underground formation into hydrogen and producing the hydrogen from a second set of fractures.

18 Claims, 4 Drawing Sheets

(56) References Cited

OTHER PUBLICATIONS

Berenblyum et al., "Subsurface Hydrogen Generation: Low Cost and Low Footprint Method of Hydrogen Production," presented at the SPE Norway Subsurface Conference, Bergen, Norway, Apr. 27, 2022, 7 pages.

Boretti et al., "Advances in Hydrogen Production from Natural Gas Reforming," Advanced Energy and Sustainability Research, 2021, 2:2100097, 10 pages.

Butler et al., "The gravity drainage of steam-heated heavy oil to parallel horizontal wells," Journal of Canadian Petroleum Technology, 1981, 8 pages.

Coats, "In-situ combustion model," Society of Petroleum Engineers, 1980, 20(6), 22 pages.

Greaves et al., "Determination of Limits to Production in Thai," presented at the SPE Heavy Oil Conference Canada, Calgary, Alberta, Canada, Jun. 12-14, 2012, 16 pages.

Hajdo et al., "Hydrogen Generation During In-Situ Combustion," presented at the SPE California Regional Meeting, Bakersfield, California, Mar. 27-29, 1985, 15 pages.

Hascakir et al., "Field-scale analysis of heavy-oil recovery by electrical heating," Society of Petroleum Engineering, Feb. 2010, 12 pages.

He et al., "Application of Inter-Fracture Injection and Production in a Cluster Well toEnhance Oil Recovery," presented at the SPE Annual Technical Conference and Exhibition, Calgary, Alberta, Canada, Sep. 30-Oct. 2, 2019, 18 pages.

He et al., "Simulation of Inter-Fracture Injection and Production in Tight Reservoirs Based on Compartmental Embedded Discrete Fracture Model," presented at the SPE Reservoir Simulation Conference, Galveston, Texas, Apr. 10-11, 2019, 19 pages.

Hoffman et al., "Light-oil steamdrive in fractured low-permeability reservoirs," presented at the SPE Western Regional/AAPG Pacific Section Joint Meeting, Long Beach, California, May 19-24, 2003, 13 pages.

Parkinson et al., "Hydrogen production using methane: Techno-economics of decarbonizing fuels and chemicals," International Journal of Hydrogen Energy, 2017, 43:2540-2555, 28 pages.

petrowiki.spe.org [online], "In-situ combustion," available on before Sep. 18, 2021, via Internet Archive: Wayback Machine URL <https://web.archive.org/web/20240000000000*/https://petrowiki.spe.org/In-situ combustion#:~:text=In%2Dsitu%20combustion%20has%20been,were%20technically%20and%20economically%20successful.>, retrieved on Sep. 9, 2024, 14 pages.

Prats, "Thermal Recovery," Society of Petroleum Engineers, Monograph vol. 7, New York, 1982, 8-14, 7 pages.

Rui et al., "Experimental Study of the Feasibility of In-Situ Hydrogen Generation from Gas Reservoir," Energies, Nov. 2022, 15:8185, 12 pages.

Singh et al., "The commercial viability and comparative economics of downhole steam generators in Alberta," Journal of Canadian Petroleum Technology, 1988, 9 pages.

\* cited by examiner

SYSTEMS AND METHODS FOR HYDROGEN PRODUCTION FROM AN UNDERGROUND FORMATION

FIELD

The disclosure relates to systems and methods for hydrogen production from an underground formation by providing heat to a first set of fractures to convert a hydrocarbon (e.g., methane, ethane, propane) present in the underground formation into hydrogen and producing the hydrogen from a second set of fractures.

BACKGROUND

Hydrogen can be produced from natural gas from oil and gas reservoirs using surface facilities, such as using steam-methane reforming. Carbon monoxide is produced as a bioproduct, which can be converted to carbon dioxide.

SUMMARY

The disclosure relates to systems and methods for hydrogen production from an underground formation by providing heat to a first set of fractures to convert a hydrocarbon (e.g., methane, ethane, propane) present in the underground formation into hydrogen and producing the hydrogen from a second set of fractures.

The systems and methods can provide relatively pure hydrogen. Hydrogen generated by the systems and methods can be transported using existing pipelines. The systems and method can be less energy intensive and less expensive relative to certain other systems and method for hydrogen production as fewer purification and/or separation steps are used. Additionally, fewer carbon dioxide capture, compression, and/or sequestration steps are used. The systems and methods can have reduced greenhouse gas (e.g., carbon dioxide) emissions relative to certain other systems and methods for hydrogen production as greenhouse gases can be stored in the underground formation. The systems and methods can have reduced costs associated with the storage and transportation of hydrogen relative to certain other systems and methods. In addition to producing hydrogen, the systems and methods can also act as an enhanced oil recovery technique.

In a first aspect, the disclosure provides a method, including heating a first set of fractures in a wellbore in an underground formation including a hydrocarbon, thereby converting at least a portion of the hydrocarbon into hydrogen; and producing a stream including the hydrogen from the underground formation via a second set of fractures in the wellbore. The second set of fractures is different from the first set of fractures.

In some embodiments, a catalyst is in the first set of fractures, and the catalyst is used to convert the hydrocarbon into hydrogen. In some embodiments, a catalyst is in the first set of fractures and the second set of fractures, and the catalyst is used to convert the hydrocarbon into hydrogen.

In some embodiments, the method further includes, prior to heating the first set of fractures, forming the first set of fractures and the second set of fractures by injecting a mixture including a proppant and a catalyst into the underground formation.

In some embodiments, the first set of fractures are heated by injecting steam into the underground formation.

In some embodiments, the first set of fractures are heated by injecting a mixture including oxygen and methane into the underground formation and combusting the mixture.

In some embodiments, the first set of fractures are heated by a member selected from the group consisting of an electrical downhole heater and an electromagnetic downhole heater.

In some embodiments, the first set of fractures are heated to a temperature of from 300° C. to 700° C.

In some embodiments, the stream further includes a gaseous impurity, and the method further includes separating the gaseous impurity from the hydrogen.

In some embodiments, the gaseous impurity includes a gas selected from the group consisting of a hydrocarbon and carbon dioxide, and the method further includes separating the gaseous impurity from the hydrogen and injecting the gaseous impurity into the underground formation.

In a second aspect, the disclosure provides a system, including a heat source configured to: i) provide heat to a first set of fractures in an underground formation and ii) convert a hydrocarbon present in the first set of fractures and in the formation between fractures into hydrogen; and a production tube configured to produce hydrogen from a second set of fractures in the underground formation. The second set of fractures is different from the first set of fractures.

In certain embodiments, the system includes a wellbore in the underground formation, and the wellbore includes the first set of fractures and the second set of fractures.

In certain embodiments, the system includes a first wellbore in the underground formation and a second wellbore in the underground formation, the first wellbore includes the first set of fractures, and the second wellbore includes the second set of fractures.

In certain embodiments, the system includes a first wellbore in the underground formation and a second wellbore in the underground formation, the first wellbore includes a first portion of the first set of fractures and a first portion of the second set of fractures, the second wellbore includes a second portion of the first set of fractures and a second portion of the second set of fractures, the second portion of the first set of fractures is different from the first portion of the first set of fractures, and the second portion of the second set of fractures is different from the first portion of the second set of fractures.

In certain embodiments, a catalyst is disposed in the first set of fractures and the second set of fractures.

In certain embodiments, the heat source includes steam, and the system further includes an injection tube configured to inject the steam into the underground formation.

In certain embodiments, the system includes an injection tube configured to inject a mixture including oxygen and methane into the underground formation, and the heat source includes heat generated from combustion of the mixture.

In certain embodiments, the heat source includes a member selected from the group consisting of an electrical downhole heater and an electromagnetic downhole heater.

In certain embodiments, the underground formation further includes an injection tube. The injection tube includes perforations that provide fluid communication between an internal space of the injection tube and the first set of fractures, and the production tube includes perforations that provide fluid communication between an internal space of the production tube and the second set of fractures.

In certain embodiments, the system further includes packers configured to prevent fluid communication between the first set of fractures and the second set of fractures.

In certain embodiments, the production produces at least one second gas selected from the group consisting of a hydrocarbon and carbon dioxide along with the hydrogen and the system includes an injection tube configured to reinject the at least one second gas into the underground formation.

DETAILED DESCRIPTION

Figure 1:
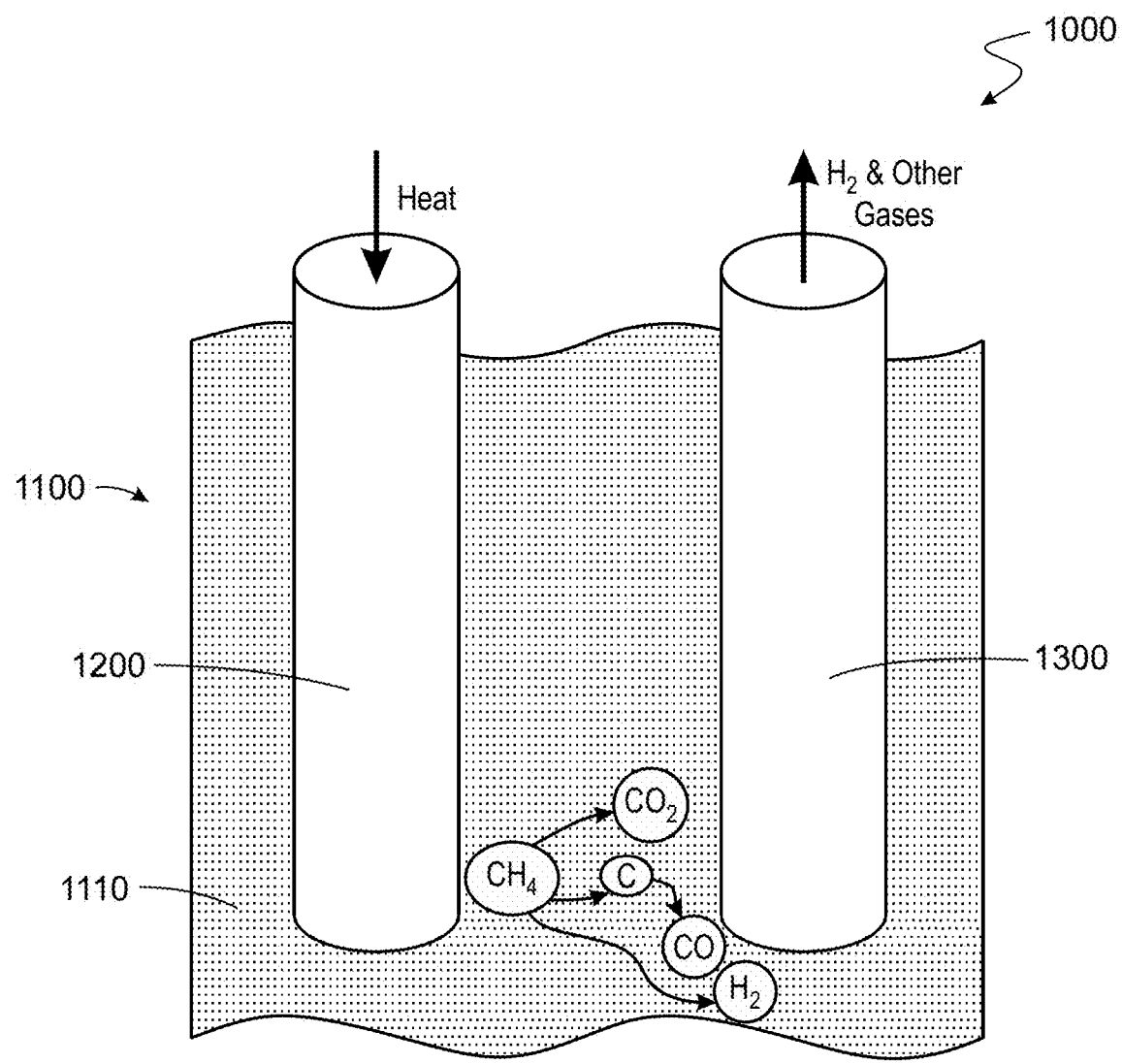
FIG. 1 depicts a schematic of a system for producing hydrogen from an underground formation.

FIG. 1 depicts a schematic of a system 1000 for producing hydrogen from an underground formation 1100. The underground formation 1100 includes an oil and gas reservoir 1110 that includes hydrocarbons (e.g., methane, ethane, propane). An injection tube 1200 is configured to inject heat into the oil and gas reservoir 1110 (see discussion below). The heat converts at least a portion of the hydrocarbons present in the oil and gas reservoir 1110 into hydrogen ($H_2$), as well as other gases such as carbon dioxide ($CO_2$) and/or carbon monoxide (CO). A production tube 1300 is configured to produce the hydrogen from the underground formation 1100. A significant amount of the carbon dioxide and/or carbon monoxide remains within the underground formation 1100.

Figure 2:
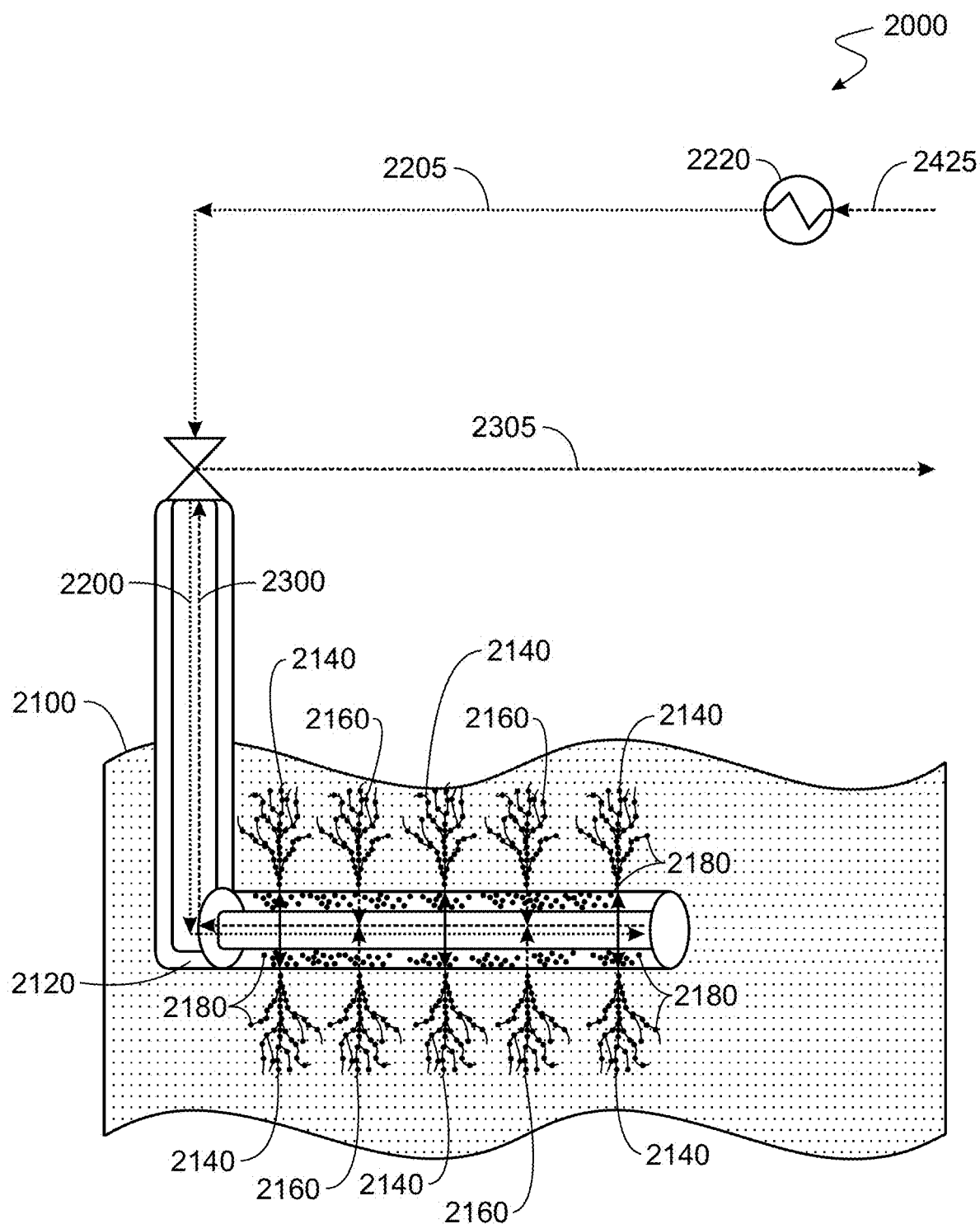
FIG. 2 depicts a schematic of a system for producing hydrogen from an underground formation.

FIG. 2 depicts a schematic of a system 2000 for producing hydrogen from an underground formation 2100. The underground formation includes a horizontal wellbore 2120 that includes injection fractures 2140 and production fractures 2160. Catalysts 2180 are disposed in the horizontal wellbore 2120, the injection fractures 2140, and the production fractures 2160. The system 2000 includes a dual-completion design. A heat source 2220 provides a heated stream 2205, which is injected into the injection fractures 2140 of the horizontal wellbore 2120 via an injection tube 2200 (see discussion below). The heat from the stream 2205 increases the temperature of catalysts 2180 disposed in the injection fractures 2140 causing the conversion of at least a portion of the hydrocarbons present in the formation between the injection fractures 2140 and production fractures 2160 into hydrogen as well as carbon dioxide and/or carbon monoxide (see discussion below). Without wishing to be bound by theory, it is believed that hydrogen is generated between the injection fractures 2140 and the production fractures 2160 and travels through the underground formation 2100 to the production fractures 2160. The hydrogen is produced from the production fractures 2160 by a production tube 2300 via the horizontal wellbore 2120.

The production tube 2300 forms a stream 2305 that contains hydrogen. The stream may also include impurities such as hydrocarbons (e.g., methane), carbon dioxide, carbon monoxide and/or sulfur-containing impurities (e.g., hydrogen sulfide, mercaptans). The stream 2305 can undergo further downstream processing to remove the impurities. The downstream processing can include a separation technique (e.g., membrane separation, pressure swing adsorption) to separate the hydrogen from the impurities. Certain impurities from the stream 2305, such as a hydrocarbon (e.g., methane) and/or hydrogen sulfide can be subjected to further processing to generate additional hydrogen. Additionally or alternatively, impurities (e.g., hydrocarbons, carbon dioxide, carbon monoxide, sulfur-containing impurities) from the stream 2305 can be compressed and heated and injected into the underground formation 2100 as at least a portion of the heated stream 2205. As noted above, the stream 2205 is injected into the underground formation 2100 via the injection tube 2200 thereby injecting the impurities (e.g., hydrocarbons, carbon dioxide, carbon monoxide, sulfur-containing impurities) back into the underground formation 2100.

Hydrogen is the main product generated and produced from the underground formation 2100. Without wishing to be bound by theory, it is believed that the amount of hydrogen generated and produced depends on the duration of the process, heating mechanisms, and properties of the underground formation 2100. In some embodiments, at least 50 (e.g., at least 60, at least 70) % and or at most 80 (e.g., at most 70, at most 60) % of the natural gas in the formation can be converted to and produced as hydrogen. Without wishing to be bound by theory, it is believed this amount will be reduced for liquid hydrocarbons relative to gaseous hydrocarbons. In some embodiments, the generated hydrogen is produced with one or more gaseous impurities such as methane, other hydrocarbons, carbon dioxide, carbon monoxide and/or other contaminants such a sulfur-containing impurity (e.g., hydrogen sulfide, mercaptans). In some embodiments, at least 50 (e.g., at least 60, at least 70, at least 80, at least 90, at least 95, at least 99, at least 99.5, at least 99.9) % and/or at most 100 (e.g., at most 99.9, at most 99.5, at most 99, at most 95, at most 90, at most 80, at most 70, at most 60) % of the stream 2305 is hydrogen.

The system 2000 results in a relatively efficient production of hydrogen, while also allowing for the recycling of other produced gases back into the underground formation 2100. Specifically, the system 2000 can produce a relatively high purity hydrogen stream. The system 2000 can also allow carbon dioxide present in the stream 2305 to be injected back into the underground formation 2100. Moreover, the system 2000 can allow methane and other hydrocarbons present in the stream 2305 to be injected back into the underground formation 2100, e.g., with air for in-situ combustion (see discussion below), used for heat generation and/or used for electricity generation.

In general, the systems and methods are applicable to any hydrocarbon. However, lighter hydrocarbons are preferred as they include a greater amount of hydrogen atoms relative to carbon atoms and can thus provide more hydrogen gas. Thus, natural gas is preferred relative to oil. However, a reservoir can include oil and gas and the systems and methods can be used to convert both to hydrogen. In some embodiments, the hydrocarbon includes an alkane, an alkene, an alkyne, and/or an aromatic compound. In some embodiments, the hydrocarbon includes methane, ethane, propane, butane, pentane, hexane, heptane, octane, nonane, and/or decane, including both linear and branched compounds.

Without wishing to be bound by theory, it is believed that the methods are suitable for unconventional rocks with very low porosity and permeability in which hydraulic fracturing is used to produce natural gas. Unconventional rocks can include shale, sand, and/or carbonates. It is also believed that due to the rock being tight, the hydrogen cannot migrate away from the wall and is instead contained near the well and fractures, thereby maximizing production.

Typically, hydraulic fracturing is not employed in conventional reservoirs. In general, unconventional reservoirs are drilled horizontally and fractured hydraulically. Hydraulic fractures in these wells can be as close as 20 feet, therefore it is relatively easy to heat between fractures. Unconventional reservoirs are extremely tight compared to conventional reservoirs. Rock permeability in unconventional reservoirs is on the order of nanodarcy to microdarcy, compared to millidarcy in conventional reservoirs. Therefore, it is easier to have the heat stay between fractures because of the tightness of the formation.

In addition to unconventional wells and reservoirs, the systems and methods can be applied to wells in conventional reservoirs.

Without wishing to be bound by theory, it is believed that conversion of a hydrocarbon, such as methane, into hydrogen gas uses relatively high heat (e.g., 300-500° C. or greater). The relatively tight space between hydraulic fractures can aid in reaching the temperatures used for hydrogen generation within the rock formation. This can be more advantageous compared to conventional reservoirs where controlling the temperature front and heat loss is relatively difficult.

Injecting heat from a first fracture and producing it a second fracture different from the first fracture can allow for relatively good heating and hydrogen production. Without wishing to be bound by theory, it is believed that having the injection fractures 2140 and the production fractures 2160 alternating can increase (e.g., maximize) heating and hydrogen generation efficiency of the rock between fractures.

In some embodiments, the depth of the formation (e.g., an unconventional formation) is at least 5000 (e.g., at least 10000, at least 15000) feet and/or at most 20000 (e.g., at most 15000, at most 10000) feet. In some embodiments, the porosity of the formation (e.g., an unconventional formation) is at least 3 (e.g., at least 4, at least 5, at least 6, at least 7, at least 8, at least 9, at least 10, at least 11, at least 12, at least 13, at least 14) % and/or at most 15 (e.g., at most 14, at most 13, at most 12, at most 11, at most 10, at most 9, at most 8, at most 7, at most 6, at most 5, at most 4) %. In some embodiments, the permeability of the formation (e.g., an unconventional formation) is at least 10 (e.g., at least 100, at least 1000) nanodarcy and/or at most 10000 (e.g., at most 1000, at most 100) nanodarcy.

The heated stream 2205 is used to raise the temperature in the injection fractures 2140 and/or in the rock between the fractures to a temperature sufficiently high to allow hydrogen generation reactions to occur to a desired extent. Generally, any appropriate heating method can be used. The choice of heating method can depend on the type and depth of the reservoir. Examples of suitable heating methods include in-situ combustion, steam injection, and electrical or electromagnetic downhole heaters. In embodiments that include in-situ combustion, steam injection and/or electrical or electromagnetic downhole heaters, the system 2000 may not include the heat source 2220. In some embodiments, a space inside the injection fractures 2140 is raised to a temperature of at least 300 (e.g., at least 350, at least 400, at least 450, at least 500, at least 550, at least 600, at least 650) ° C. and/or at most 700 (e.g., at most 650, at most 600, at most 550, at most 500, at most 450, at most 400, at most 350) ° C. Without wishing to be bound by theory, the purity of the hydrogen produced from the underground formation 2100 can be increased (e.g., maximized) based on an appropriate selection of the temperature and maintenance of the temperature.

In certain embodiments, the heating method includes steam injection and the stream 2205 includes steam which is injected into the underground formation 2100 via the injection tube 2200. The heat source 2220 can be used to generate the steam. In such embodiments, the method can include cyclic steam injection and/or steam flooding. Without wishing to be bound by theory, it is believed that heating methods that include steam injection are well suited for relatively shallow and/or thick reservoirs as the heat loss from the wellbore and to the over/under burden is limited. If the reservoir depth is greater than 4000 feet (such as in certain shale reservoirs), heat loss from the wellbore may make injection of steam from the surface uneconomical. Depending on the depths and reservoir considered, it is possible to use down-hole steam generators, but these generators are not commonly used because of high maintenance costs and combustion control problems downhole. Furthermore, as depth increases, the reservoir pressure increases and the latent heat of the steam decreases.

Without wishing to be bound by theory, it is believed that electrical downhole heaters and/or in-situ combustion can be good choices for deep reservoirs like unconventional shale. It is further believed that unconventional reservoirs with hydraulic fractures provides relatively good control of heating as only the space around the injection fracture 2140 will be heated.

In certain embodiments, the heating method includes in-situ combustion and the stream 2205 includes methane and an oxygen-containing gas (e.g., air), which are injected into the underground formation 2100 via the injection tube 2200.

The reaction for the in-situ combustion corresponds to:

$CH_4 + 2O_2 \rightarrow CO_2 + 2H_2O$  $\Delta H_{295} = -891$ kJ/mol In some embodiments, methane and oxygen are injected in a ratio of at least 1:2 (e.g., 1:3, 1:4, 1:5) ratio. In some embodiments, air is used as the source of oxygen and methane and air are injected.

Without wishing to be bound by theory, it is believed that methane and/or other gases present in the underground formation 2100 are converted to hydrogen via steam-methane reforming reactions, auto thermal reforming reactions, water-gas shift reactions, and/or catalytic cracking. The steam-methane reforming reactions correspond to:

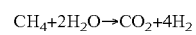
$CH_4 + 2H_2O \rightarrow CO_2 + 4H_2$

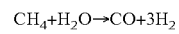
$CH_4 + H_2O \rightarrow CO + 3H_2$

The auto thermal reforming reactions correspond to:

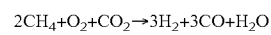
$2CH_4 + O_2 + CO_2 \rightarrow 3H_2 + 3CO + H_2O$

$4CH_4 + O_2 + 2H_2O \rightarrow 10H_2 + 4CO$

The water-gas shift reaction corresponds to:

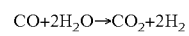
$CO + 2H_2O \rightarrow CO_2 + 2H_2$

The catalytic cracking reaction corresponds to:

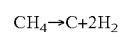
$CH_4 \rightarrow C + 2H_2$

Without wishing to be bound by theory, it is believed that the steam-methane reforming reactions and the water-gas shift reaction occur away from the fracture face (the surface of the injection fractures 2140 of the horizontal wellbore 2120). It is also believed that the auto thermal reforming reactions occur near the fracture face. It is further believed that the catalytic cracking reaction and the coke gasification reactions (see discussion below) occurs within the injection fractures 2140 and/or the horizontal wellbore 2120. Without wishing to be bound by theory, it is believed that the multiple hydrogen generation mechanisms can increase (e.g., maximize) hydrogen production.

In general, the heat can be introduced into the individual injection fractures 2140 simultaneously, separately, or in groups. Similarly, gas can be produced from the individual production fractures 2160 simultaneously, separately, or in groups. Thus, hydrogen production from the underground formation 2100 can involve multiple stages with movement along the horizontal wellbore 2120 between the stages. In some embodiments, packers (see discussion below) can be moved along the horizontal wellbore 2120 from deeper fractures to shallower fractures.

In general, the catalyst 2180 can be any suitable catalyst for the conversion of a hydrocarbon (e.g., methane, ethane, propane) to hydrogen. Examples of the catalyst 2180 include catalysts based on iron, cobalt, nickel, and/or their alloys. Without wishing to be bound by theory, it is believed that the surface of the catalyst 2180 should have affinity for the molecular adsorption mechanism, such that the hydrocarbon (e.g., methane) adsorbs onto the surface of the catalyst 2180 then subsequently dissociates following a series of stepwise surface dehydrogenation reactions. Without wishing to be bound by theory, it is believed that the catalytic cracking of methane can generate additional hydrogen while depositing solid carbon (coke) over the surface of the catalyst 2180.

In some embodiments, hydrogen is generated by the in-situ cleaning of coke via the coke gasification reaction, which corresponds to one or more of:

$$C+H_2O(steam) \rightarrow CO+H_2$$

$$C+CO_2 \rightarrow 2CO$$

$$C+O_2 \rightarrow CO_2$$

Without wishing to be bound by theory, it is believed that coke can be cleaned up during the combustion with oxygen (e.g., oxygen from air). It is also believed that coke can be cleaned up by injecting carbon dioxide. It is further believed that coke can be cleaned up with steam injection, which also generates additional hydrogen. Without wishing to be bound by theory, it is believed that carbon dioxide and/or carbon monoxide generated by the gasification reaction from the in-situ cleaning of coke will move into the formation and be sequestered by adsorption. It is also believed that the carbon monoxide can react with water (e.g., formation water) to provide additional hydrogen via the water-gas shift reaction. Without wishing to be bound by theory, it is believed that the ability of the catalyst 2180 to generate hydrogen will reduce over time due to coke deposition. Thus, it is generally desirable to remove coke from the catalyst 2180. In embodiments that include electrical heating and dry catalytic cracking, steam may be occasionally injected into the underground formation 2100 to assist with cleaning coke from the surface of the catalyst 2180.

Without wishing to be bound by theory, it is believed that during hydrogen production, carbon dioxide will deposit as solid carbon (coke) on the surface of the catalyst 2180. It is also believed that solid carbon (coke) can be cleaned from the surface of the catalyst 2180 using coke gasification with steam to generate additional hydrogen (see discussion above). It is further believed that carbon monoxide generated using coke gasification will be pushed further into the underground formation 2100.

The injection fractures 2140 and the production fractures 2160 can be formed by hydraulic fracturing. Proppants can be employed to keep the fractures open. During this hydraulic fracturing, the catalyst 2180 is injected together with the proppant, resulting in the catalyst 2180 being placed in the injection fractures 2140, the production fractures 2160, and the horizontal wellbore 2120. Generally, the particles of the catalyst 2180 will be smaller than that of the proppants to fill the space between proppants. In some embodiments, the size (e.g., diameter) of the particles of the catalyst 2180 are at least 40 (e.g., at least 50, at least 60, at least 70, at least 80, at least 90, at least 100, at least 110, at least 120, at least 130, at least 140) μm and/or at most 150 (e.g., at most 140, at most 130, at most 120, at most 110, at most 100, at most 90, at most 80, at most 70, at most 60, at most 50) μm. In some embodiments, the size of the proppants is at least 106 (e.g., at least 150, at least 200, at least 250, at least 300, at least 350, at least 400, at least 450, at least 500, at least 550, at least 600, at least 650, at least 700, at least 750, at least 800, at least 850, at least 900, at least 950, at least 1000, at least 1100, at least 1200, at least 1300, at least 1400, at least 1500, at least 1600, at least 1700, at least 1800, at least 1900, at least 2000, at least 2100, at least 2200, at least 2300) μm and/or at most 2360 (e.g., at most 2300, at most 2200, at most 2100, most 2000, most 1900, most 1800, at most 1700, at most 1600, at most 1500, and most 1400, most 1300, at most 1200, at most 1100, at most 1000, at most 950 at most 900, at most 850, at most 800, at most 750, at most 700, at most 650, at most 600, at most 550, at most 500, at most 450, at most 400, at most 350, at most 300, at most 250, at most 200, at most 150) μm. The mixture ratio of the proppant to the catalyst 2180 is determined by the operation conditions, reservoir rock properties, composition of the reservoir hydrocarbons, and the reservoir temperature and pressure. Without wishing to be bound by theory, it is believed that the maximum amount of the catalyst 2180 is determined by the pore spacing between the proppants.

In some embodiments, after the hydraulic fracturing and backflow operations (when the well is opened and fluids (including hydraulic fracturing fluids and volatile hydrocarbons) are collected at the surface) are completed, the horizontal wellbore 2120 is filled with catalyst 2180 particles depending on the volume of the catalyst 2180 needed. Such an operation may be similar to gravel packing of a horizontal well. In some embodiments, a screen or filter is used to prevent backflow of the catalyst 2180 during production. The size of the screen or filter is such that it is small enough to prevent the movement of the catalyst towards the wellhead.

Without wishing to be bound by theory, it is believed that the methods can also act as an enhanced oil recovery technique by enhancing mobility and recovery of hydrocarbons in the underground formation 2100. Thus, the methods can be employed in depleted or nearly depleted unconventional wells to recover hydrocarbons. In general, carbon dioxide generated by the steam-methane reforming reactions, the water-gas shift reaction and/or the auto thermal reforming reactions can increase the overall pressure of an oil reservoir, thereby forcing the hydrocarbons towards the production tube 2300. It is also believed that the carbon dioxide can blend with the oil in the reservoir, thereby improving its mobility and allowing it to flow more easily. Without wishing to be bound by theory, it is believed that a relatively large portion of the carbon dioxide generated will be absorbed to the rock surface and stay within the underground formation 2100. Additionally, it is believed that heating the hydrocarbons can enhance their recovery.

Without wishing to be bound by theory, it is believed that heavier hydrocarbon components in tight unconventional rock cannot easily flow because of the tightness of the rock (low permeability). However, carbon dioxide can mobilize some of these hydrocarbons towards the production fractures 2160, thereby improving hydrocarbon recovery from unconventional reservoirs. At least portion of these hydrocarbons can be cracked and generate additional hydrogen and/or produced as impurities together with the hydrogen from the production fractures 2160.

Without wishing to be bound by theory, it is believed that when the temperature in and/or around the injection fractures 2140 reaches 300° C. to 700° C., kerogen and/or other hydrocarbon components can crack into smaller hydrocarbon components. It is further believed that the fluid viscosity will drop thereby increasing the mobility of fluids towards the production tube 2300. It is also believed that the cracking of kerogen into lighter hydrocarbon components can increase the porosity and permeability, thereby enhancing the flow towards the production tube 2300. Additionally, it is believed that these enhancements will improve over time as heat is continually applied to the underground formation 2100.

While the system 2000 includes a single horizontally placed well with the injection fractures 2140 and the production fractures 2160 in the same horizontal wellbore 2120, other configurations of the wellbore, injection fractures 2140 and production fractures 2160 can be employed. For example, in some embodiments, the injection fractures 2140 may be present in a first wellbore (e.g., a horizontal wellbore) and the production fractures 2160 may be present in a second wellbore (e.g., a horizontal wellbore) different from the first wellbore. As another example, in some embodiments, injection fractures 2140 and production fractures 2160 may be present in a first wellbore (e.g., a horizontal wellbore) and additional injection fractures 2140 and/or production fractures 2160 may be present in a second wellbore (e.g., a horizontal wellbore) different from the first wellbore. As a further example, in some embodiments, the injection fractures 2140 may be present in a first wellbore (e.g., a horizontal wellbore), the production fractures 2160 may be present in a second wellbore (e.g., a horizontal wellbore) different from the first wellbore and additional injection fractures 2140 and/or production fractures 2160 may be present in the first wellbore and/or the second wellbore. Generally, the selection of a configuration may depend on the reservoir.

Figure 3:
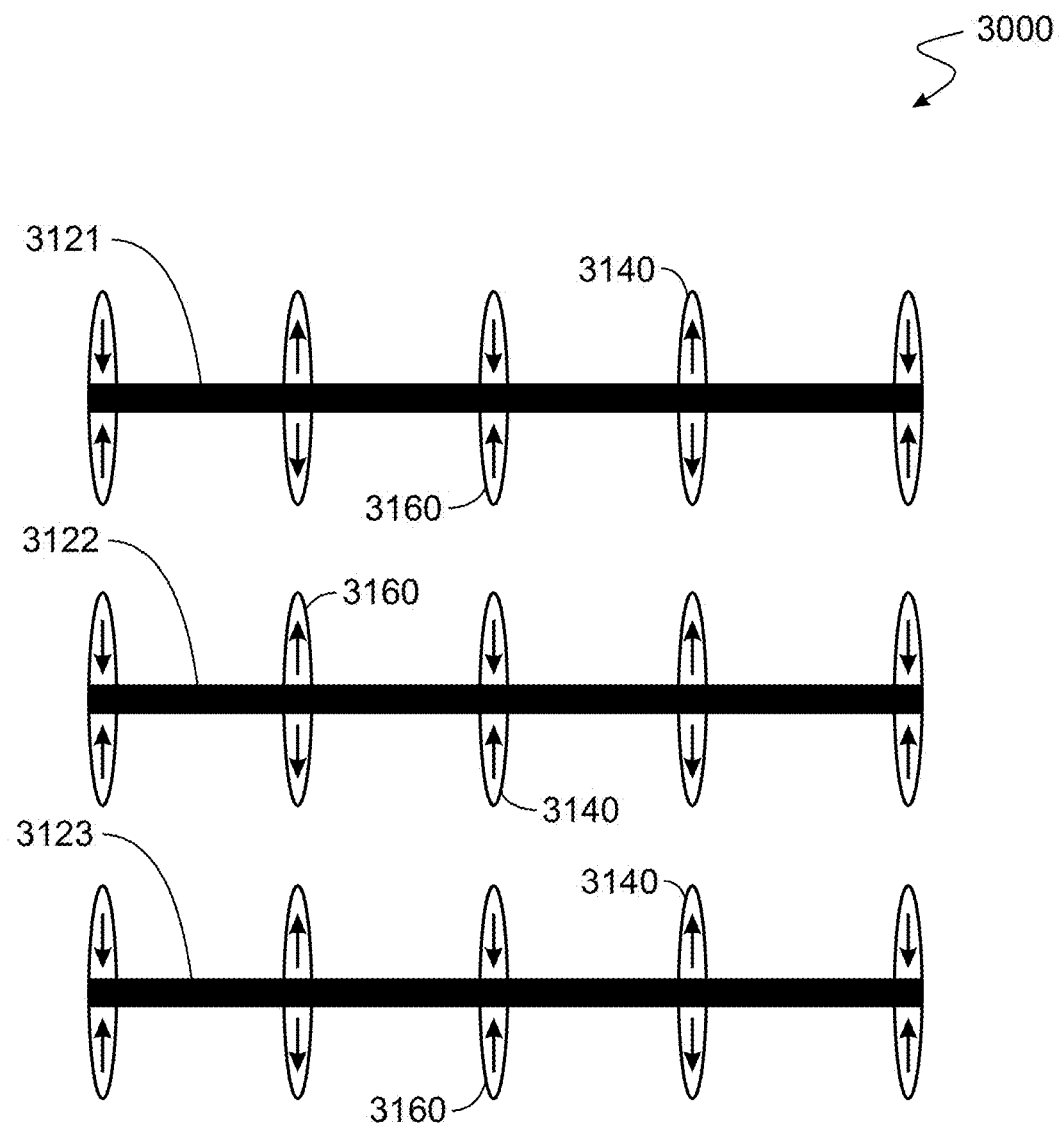
FIG. 3 depicts a schematic of a system that includes first, second, and third, horizontal wells.

In embodiments that include more than one horizontal wellbore, the horizontal wellbores can be vertically stacked. FIG. 3 depicts a schematic of a system 3000 that includes first, second, and third horizontal wells 3121, 3122, and 3123, respectively. In the system 3000, each of the first, second, and third, horizontal wells 3121, 3122, and 3123 includes injection fractures 3140 and production fractures 3160. The first, second, and third, horizontal wells 3121, 3122, and 3123 horizontal wells can be drilled from a single borehole or can be coming from multiple boreholes. The first, second, and third, horizontal wells 3121, 3122, and 3123 can be stacked vertically or placed horizontally.

Figure 4:
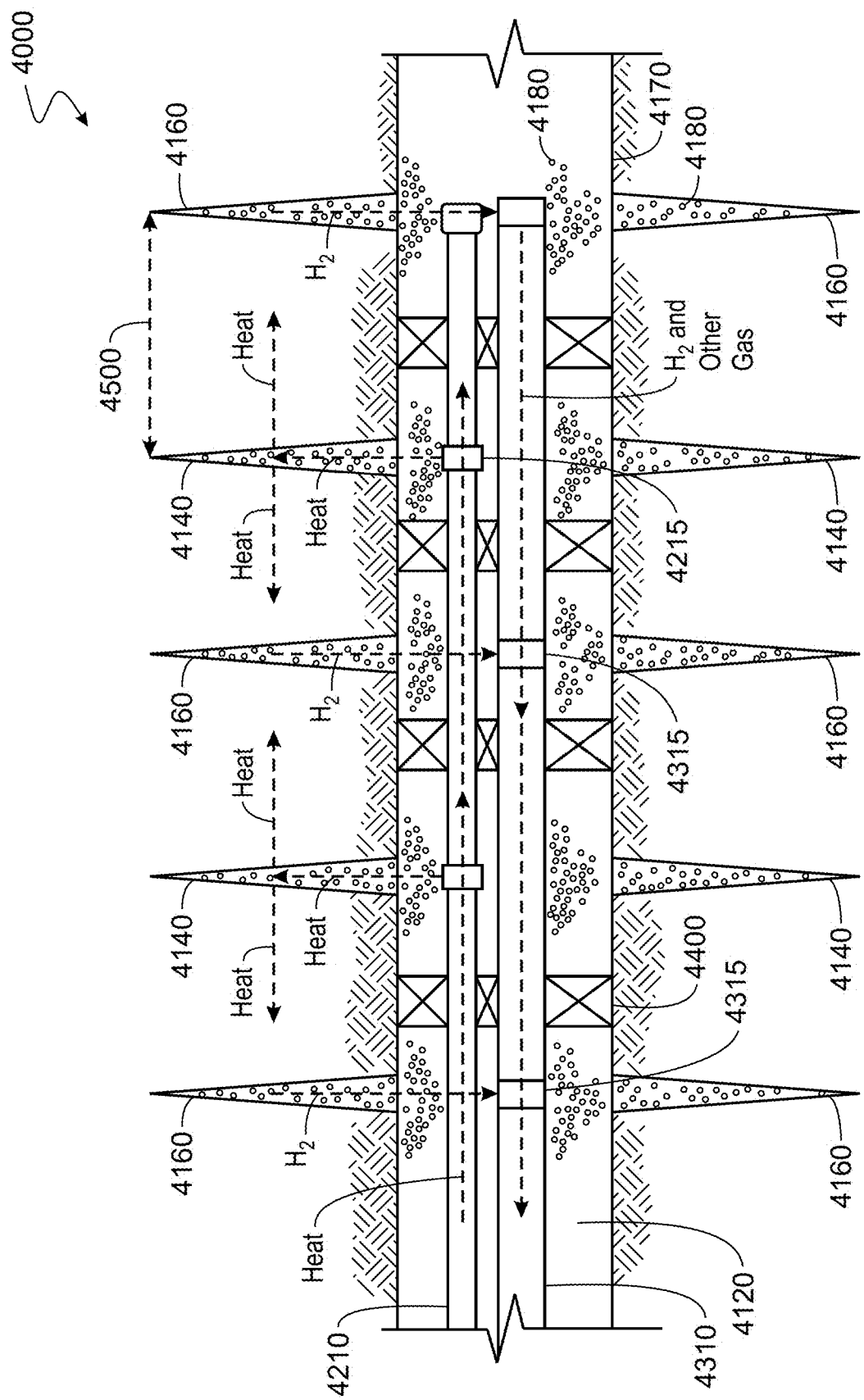
FIG. 4 depicts a schematic of a system with a dual completion design with wellbore isolation.

In embodiments in which the injection fractures and recovery fractures are in the same wellbore, as shown in FIG. 2, wellbore isolation may be used to isolate the injection fractures and production fractures. FIG. 4 depicts a schematic of a system 4000 with a dual completion design with wellbore isolation. The system 4000 includes a wellbore 4120 with injection fractures 4140 and production fractures 4160. A casing 4170 is inserted into the wellbore 4120. An injection tube 4210 and a production tube 4310 are disposed in the wellbore 4120. Perforations 4215 in the injection tube 4210 allow for fluid communication between the interior of the injection tube 4210 and the injection fractures 4140. Similarly, perforations 4315 in the production tube 4310 allow for fluid communication between the interior of the production tube 4310 and the production fractures 4160. Packers 4400 disposed in the wellbore 4120 prevent fluid communication between the injection sections (injection fractures 4140 and perforations 4215) and the production sections (production fractures 4160 and perforations 4315). Without wishing to be bound by theory, it is believed that this isolation between injection zones and production zones allows the injection fractures 4140 and the production fractures 4160 to be placed in the same wellbore.

Catalyst 4180 is present in the wellbore 4120, the injection fractures 4140 and the production fractures 4160. Heat can be introduced into the injection fractures 4140 via the injection tube 4210. In the injection fractures 4140, the catalyst 4180 can convert at least a portion of the hydrocarbons (e.g., methane) present into hydrogen. Hydrogen can then be produced from the production fractures 4160 via the production tube 4310.

In general, the packers 4400 are used to seal off injection sections from production sections. The packers 4400 can be added after forming the fractures and/or prior to injecting the fluids (e.g., the heat source).

Without wishing to be bound by theory, it is believed that the fracture spacing 4500 (e.g., the spacing between the injection fractures 4140 and the production fractures 4160) can be designed to increase (e.g., maximize) the production of hydrogen with modeling and/or simulation studies.

Without wishing to be bound by theory, it is believed that the spacing and geometry of the fractures can be optimized using modeling and simulation studies and depends on many subsurface factors and rock characteristics. It is further believed that although modeling can provide estimates of optimum spacing, lengths, heights, etc., it may be relatively difficult to control these parameters operationally. In some embodiments, the spacing between hydraulic fractures is at least 25 (e.g., at least 30, at least 35, at least 40, at least 45, at least 50, at least 55, at least 60, at least 65, at least 70, at least 75, at least 80, at least 85, at least 90, at least 95) feet and/or at most 100 (e.g., at most 95, at most 90, most 85, at most 80, at most 75, at most 70, at most 65, at most 60, and most 55, at most 50, at most 45, at most 40, at most 35, at most 30) feet. In some embodiments, the fractures are at least 3 (e.g., at least 4, at least 5) mm and/or at most 6 (e.g., at most 5, at most 4) mm wide near the wellbore. In some embodiments, the fractures can extend up to 400 meters horizontally and/or up to 100 meters vertically within the gas-bearing formation. However, the width, horizontal extension, and vertical extension can vary widely.

In general, the dimensions of the injection tube 4210, the production tube 4310, and the casing 4170 may be selected as appropriate based on the application. In certain embodiments, the diameters of the injection tube 4210 and the production tube 4310 are 2⅞" and the diameter of casing 4170 is 9". In certain embodiments, the diameters of the injection tube 4210 and the production tube 4310 are 2" and the diameter of the casing 4170 is 7".

Without wishing to be bound by theory, it is believed that when the systems and methods are employed in an underground formation with tight rocks (e.g., an unconventional shale reservoir) hydrogen migration will be relatively low. Additionally, it is believed that generated hydrogen can be stored in the underground formation (e.g., in the stimulated reservoir volume) ready for production. Thus, the systems and methods can provide cost savings relative to certain other systems and methods for the subsurface storage of hydrogen (e.g., salt domes, depleted gas or saline aquifers).

Without wishing to be bound by theory, it is believed that when the systems and methods are employed in an underground formation with tight rocks (e.g., an unconventional shale reservoir) with the relatively tight spaces between the horizontal wells and the hydraulic fractures can make it easier to reach the elevated temperatures desired for hydrogen generation relative to those that are not hydraulically fractured. It is further believed that since heat is being injected from fractures, it is easier to heat smaller volumes of rock between the fractures and heat loss can be minimized.

EMBODIMENTS

1. A method, including:
heating a first set of fractures in a wellbore in an underground formation including a hydrocarbon, thereby converting at least a portion of the hydrocarbon into hydrogen; and
producing a stream including the hydrogen from the underground formation via a second set of fractures in the wellbore,
wherein the second set of fractures is different from the first set of fractures.
2. The method of embodiment 1, wherein a catalyst is in the first set of fractures, and the catalyst is used to convert the hydrocarbon into hydrogen.
3. The method of embodiment 1 or 2, further including, prior to heating the first set of fractures, forming the first set of fractures and the second set of fractures by injecting a mixture including a proppant and a catalyst into the underground formation.
4. The method of any one of embodiments 1-3, wherein the first set of fractures are heated by injecting steam into the underground formation.
5. The method of any one of embodiments 1-3, wherein the first set of fractures are heated by injecting a mixture including oxygen and methane into the underground formation and combusting the mixture.
6. The method of any one of embodiments 1-3, wherein the first set of fractures are heated by a member selected from the group consisting of an electrical downhole heater and an electromagnetic downhole heater.
7. The method of any one of embodiments 1-6, wherein the first set of fractures are heated to a temperature of from 300° C. to 700° C.
8. The method of any one of embodiments 1-7, wherein the stream further includes a gaseous impurity, and the method further includes separating the gaseous impurity from the hydrogen.
9. The method of claim 8, wherein the gaseous impurity includes a gas selected from the group consisting of a hydrocarbon and carbon dioxide, and the method further includes: separating the gaseous impurity from the hydrogen; and injecting the gaseous impurity into the underground formation.
10. A system, including:
a heat source configured to: i) provide heat to a first set of fractures in an underground formation; and ii) convert a hydrocarbon present in the first set of fractures and in the formation between fractures into hydrogen; and
a production tube configured to produce hydrogen from a second set of fractures in the underground formation, wherein the second set of fractures is different from the first set of fractures.

11. The system of embodiment 10, wherein the system includes a wellbore in the underground formation, and the wellbore includes the first set of fractures and the second set of fractures.
12. The system of embodiment 10, wherein:
the system includes a first wellbore in the underground formation and a second wellbore in the underground formation;
the first wellbore includes the first set of fractures; and
the second wellbore includes the second set of fractures.
13. The system of embodiment 10, wherein:
the system includes a first wellbore in the underground formation and a second wellbore in the underground formation;
the first wellbore includes a first portion of the first set of fractures and a first portion of the second set of fractures;
the second wellbore includes a second portion of the first set of fractures and a second portion of the second set of fractures;
the second portion of the first set of fractures is different from the first portion of the first set of fractures; and
the second portion of the second set of fractures is different from the first portion of the second set of fractures.
14. The system of any one of embodiments 10-13, wherein a catalyst is disposed in the first set of fractures and the second set of fractures.
15. The system of any one of embodiments 10-14, wherein the heat source includes steam, and the system further includes an injection tube configured to inject the steam into the underground formation.
16. The system of any one of embodiments 10-14, wherein the system includes an injection tube configured to inject a mixture including oxygen and methane into the underground formation, and the heat source includes heat generated from combustion of the mixture.
17. The system of any one of embodiments 10-14, wherein the heat source includes a member selected from the group consisting of an electrical downhole heater and an electromagnetic downhole heater.
18. The system of any one of embodiments 10-14, wherein:
the underground formation further includes an injection tube;
the injection tube includes perforations that provide fluid communication between an internal space of the injection tube and the first set of fractures; and
the production tube includes perforations that provide fluid communication between an internal space of the production tube and the second set of fractures.
19. The system of embodiment 18, further including packers configured to prevent fluid communication between the first set of fractures and the second set of fractures.
20. The system of any one of embodiments 10-14, wherein:
the production tube produces at least one second gas selected from the group consisting of a hydrocarbon and carbon dioxide along with the hydrogen; and
the system includes an injection tube configured to reinject the at least one second gas into the underground formation.

What is claimed is:
1. A method, comprising:
a) forming a first set of fractures in an underground formation and a second set of fractures in the underground formation by injecting a mixture comprising a proppant and a catalyst into a wellbore in the underground formation, the first set of fractures being dif- ferent from the second set of fractures, the first set of fractures comprising a hydrocarbon;
b) after a), heating the first set of fractures, thereby converting at least a portion of the hydrocarbon present in the first set of fractures into hydrogen, wherein the first set of fractures is heated by injecting a mixture comprising oxygen and methane into the underground formation and combusting the mixture, wherein the methane and oxygen are injected in a ratio of at least 1:2;
c) after b), allowing at least a portion of the hydrogen to enter the second set of fractures; and
d) after c), producing a stream from a production tube, the stream passing from the second set of fractures then to the production tube, the stream comprising the hydrogen from the second set of fractures.

2. The method of claim 1, wherein a catalyst is in the first set of fractures, and the catalyst is used to convert the hydrocarbon into hydrogen.

3. The method of claim 1, wherein the first set of fractures is further heated by injecting steam into the underground formation.

4. The method of claim 1, wherein the first set of fractures is further heated by a member selected from the group consisting of an electrical downhole heater and an electromagnetic downhole heater.

5. The method of claim 1, wherein the first set of fractures is heated to a temperature of from 300° C. to 700° C.

6. The method of claim 1, wherein the stream further comprises a gaseous impurity, and the method further comprises separating the gaseous impurity from the hydrogen.

7. The method of claim 6, wherein the gaseous impurity comprises a gas selected from the group consisting of a hydrocarbon and carbon dioxide, and the method further comprises:
separating the gaseous impurity from the hydrogen; and
injecting the gaseous impurity into the underground formation.

8. The method of claim 1, further comprising, after a) but before b), disposing packers into the wellbore,
wherein the packers prevent fluid communication between the first set of fractures and the second set of fractures.

9. The method of claim 1, wherein the first set of fractures and the second set of fractures alternate in the underground formation.

10. A system, comprising:
an injection tube extending into an underground formation, the injection tube comprising perforations so that an interior of the injection tube is in fluid communication with a first set of fractures in the underground formation;
a heat source configured to heat the first set of fractures to convert a hydrocarbon present in the first set of fractures into hydrogen, wherein the first set of fractures is heated by injecting a mixture comprising oxygen and methane into the underground formation and combusting the mixture, wherein the methane and oxygen are injected in a ratio of at least 1:2;
a production tube extending into the underground formation, the production tube comprising perforations so that an interior of the production tube is in fluid communication with a second set of fractures different from the first set of fractures, the production tube configured to produce a stream, the stream passing from the second set of fractures to the production tube via the perforations in the production tube, the stream comprising hydrogen from the second set of fractures that passed from the first set of fractures to the second set of fractures; and
packers configured to prevent fluid communication between the first set of fractures and the second set of fractures.

11. The system of claim 10, wherein the system comprises a wellbore in the underground formation, and the wellbore comprises the injection tube and the production tube.

12. The system of claim 10, wherein:
the system comprises a first wellbore in the underground formation and a second wellbore in the underground formation;
the first wellbore comprises the injection tube; and
the second wellbore comprises the production tube.

13. The system of claim 10, wherein a catalyst is disposed in the first set of fractures and the second set of fractures.

14. The system of claim 10, wherein the heat source further comprises steam, and the system is configured so that the steam enters the first set of fractures via the perforations in the injection tube.

15. The system of claim 10, wherein the injection tube is configured to inject a mixture comprising oxygen and methane into the first set of fractures via the perforations in the injection tube, and the heat source comprises heat generated from combustion of the mixture.

16. The system of claim 10, wherein the heat source further comprises a member selected from the group consisting of an electrical downhole heater and an electromagnetic downhole heater.

17. The system of claim 10, wherein:
the production tube produces at least one second gas selected from the group consisting of a hydrocarbon and carbon dioxide along with the hydrogen; and
the injection tube is configured to reinject the at least one second gas into the underground formation.

18. The system of claim 10, wherein the first set of fractures and the second set of fractures alternate in the underground formation.

* * * * *